(12) United States Patent
Yagi

(10) Patent No.: US 10,794,488 B2
(45) Date of Patent: Oct. 6, 2020

(54) SEALING DEVICE AND SEALING ASSEMBLY

(71) Applicant: NOK CORPORATION, Tokyo (JP)

(72) Inventor: Masaaki Yagi, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/333,452

(22) PCT Filed: Sep. 27, 2017

(86) PCT No.: PCT/JP2017/034880
§ 371 (c)(1),
(2) Date: Mar. 14, 2019

(87) PCT Pub. No.: WO2018/066424
PCT Pub. Date: Apr. 12, 2018

(65) Prior Publication Data
US 2019/0219171 A1 Jul. 18, 2019

(30) Foreign Application Priority Data

Oct. 4, 2016 (JP) .................................. 2016-196441

(51) Int. Cl.
*F16J 15/18* (2006.01)
*F16K 5/06* (2006.01)
(Continued)

(52) U.S. Cl.
CPC ........... *F16J 15/18* (2013.01); *F16J 15/3204* (2013.01); *F16J 15/3212* (2013.01);
(Continued)

(58) Field of Classification Search
CPC ...... F16J 15/18; F16J 15/3204; F16J 15/3212; F16J 15/3224; F16K 5/0673; F16K 5/0678; F16K 5/201; F16K 5/205
See application file for complete search history.

(56) References Cited

U.S. PATENT DOCUMENTS 2,503,639 A * 4/1950 Snyder .................. F16K 5/0464
                                                              137/625.47
3,210,042 A * 10/1965 Freeman ............... F16K 5/0678
                                                              251/175
(Continued)

FOREIGN PATENT DOCUMENTS

CN          202469061 U    10/2012
CN          105333173 A    2/2016
(Continued)

OTHER PUBLICATIONS

International Search Report for PCT/JP2017/034880, dated Dec. 12, 2017 (four pages).

(Continued)

*Primary Examiner* — David Colon-Morales
(74) *Attorney, Agent, or Firm* — Pearne & Gordon LLP

(57) ABSTRACT

A sealing device for sealing between a valve body which is movably disposed in a valve box and which controls the flow of a fluid, and a tube which is connected to the valve box or is a part of the valve box and through which the fluid flows, is provided. The sealing device includes: a first seal portion which is a resin annular plate or film and is to be closely contacted with the outer surface of the valve body; and a cylindrical second seal portion which is formed from a material more flexible than that of the first seal portion, contacts the inner outer surface of the tube, and prevents the fluid from leaking from the tube. The first seal portion and the second seal portion are integrally joined. A flange joined to the first seal portion is formed on an edge of the second seal portion.

7 Claims, 6 Drawing Sheets

(51) Int. Cl.
*F16J 15/3224* (2016.01)
*F16J 15/3212* (2016.01)
*F16J 15/3204* (2016.01)
*F16K 5/20* (2006.01)

(52) U.S. Cl.
CPC ............ *F16J 15/3224* (2013.01); *F16K 5/06* (2013.01); *F16K 5/0678* (2013.01); *F16K 5/201* (2013.01)

(56) References Cited

U.S. PATENT DOCUMENTS

| | | | | | |
|---|---|---|---|---|---|
| 3,266,769 | A | * | 8/1966 | Shand | F16K 5/0673 251/172 |
| 3,357,679 | A | * | 12/1967 | Gulick | F16K 5/0673 251/172 |
| 3,380,708 | A | * | 4/1968 | Domer | F16K 5/0673 251/172 |
| 3,397,861 | A | * | 8/1968 | Domer | F16K 5/0673 251/175 |
| 3,401,914 | A | * | 9/1968 | Shand | F16K 5/0673 251/172 |
| 3,520,512 | A | * | 7/1970 | Huber | F16K 5/0626 251/172 |
| 3,554,484 | A | * | 1/1971 | Gachot | F16K 5/0631 251/152 |
| 3,592,440 | A | * | 7/1971 | McFarland | B22F 3/26 251/170 |
| 4,269,391 | A | * | 5/1981 | Saito | F16J 15/30 251/315.03 |
| 4,593,918 | A | * | 6/1986 | Geissler | F01L 7/10 123/188.6 |
| 7,635,113 | B2 | * | 12/2009 | Bearer | F16K 5/0678 251/174 |
| 7,712,724 | B2 | * | 5/2010 | Thomas | F16K 5/201 137/602 |
| 8,820,706 | B2 | * | 9/2014 | Kawauchi | F16K 5/205 251/180 |
| 9,897,217 | B2 | * | 2/2018 | Greene | F16K 5/201 |
| 10,513,968 | B2 | * | 12/2019 | Yumisashi | F16K 11/087 |
| 2004/0036052 | A1 | * | 2/2004 | Nowak | F16K 5/0673 251/314 |
| 2011/0266481 | A1 | | 11/2011 | Collison et al. | |
| 2014/0291566 | A1 | * | 10/2014 | Yokoyama | F16K 5/0689 251/315.01 |
| 2015/0300508 | A1 | * | 10/2015 | He | F16K 5/0689 251/314 |
| 2016/0319940 | A1 | | 11/2016 | Funato et al. | |
| 2017/0321812 | A1 | * | 11/2017 | Jang | F16K 5/201 |
| 2017/0321830 | A1 | * | 11/2017 | Bareis | F16L 21/03 |
| 2017/0335750 | A1 | | 11/2017 | Yumisashi et al. | |
| 2018/0119826 | A1 | * | 5/2018 | Nguyen | F16K 5/0605 |
| 2018/0340620 | A1 | * | 11/2018 | Wicher | F16J 15/104 |

FOREIGN PATENT DOCUMENTS

| | | |
|---|---|---|
| JP | S56-18465 U | 2/1981 |
| JP | H10169799 A | 6/1998 |
| JP | 2007182921 A | 7/2007 |
| JP | 2009041776 A | 2/2009 |
| JP | 2013527393 A | 6/2013 |
| JP | 20166075353 A | 5/2016 |
| JP | 2016114125 A | 6/2016 |
| WO | 2016067737 A1 | 5/2016 |

OTHER PUBLICATIONS

Extended European Search Report for European Application No. 17858262.3 dated May 12, 2020.

* cited by examiner

SEALING DEVICE AND SEALING ASSEMBLY

TECHNICAL FIELD

The present invention relates to a sealing device for preventing a fluid from leaking from a tube which is connected to a valve box or is a part of the valve box and a valve body by sealing therebetween, and a sealing assembly having such a sealing device.

BACKGROUND ART

Conventionally, as a sealing mechanism for sealing between a tube connected to a valve box and a valve body there is, for example, the invention disclosed in Patent Document 1. Patent Document 1 relates to a refrigerant control valve device and this refrigerant control valve device comprises, as shown in FIG. 6, a valve housing 100 and a valve body 102 that is rotatably disposed about an axis of rotation X in the valve housing 100 and controls the flow of a refrigerant. A discharge cylinder 104 is connected to the valve housing 100.

A sealing mechanism for sealing between the discharge cylinder 104 and the valve body 102 is provided at the connection between the valve housing (valve box) 100 and the discharge cylinder (tube) 104. This sealing mechanism has three ring-shaped members: a seal ring 106, a packing body 108, and a support ring 110, centered on the central axis Y of the discharge cylinder 104. Further, the sealing mechanism has a spring 112.

The seal ring 106 is formed from a resin material and contacts the outer surface of the valve body 102. The packing body 108 is formed from a resin material and contacts the outer surface of a sleeve 104A at a tip of the discharge cylinder 104. The support ring 110 is constituted by a metal material such as stainless steel. The spring 112 applies a biasing force to the seal ring 106 via the support ring 110.

PRIOR ART DOCUMENTS

Patent Documents

Patent Document 1: JP 2016-114125 A

SUMMARY OF THE INVENTION

Problem to be Solved by the Invention

In this type of sealing mechanism, a seal portion preferably constantly closely contacts the outer surface of a valve body, the number of parts of the sealing mechanism is preferably small, and mounting on a valve device is preferably easy.

Thus, the objective of the present invention is to provide a sealing device with high contact of a seal portion to the outer surface of a valve body, a small number of parts, and easy mounting on a valve device, and a sealing assembly comprising such a sealing device.

Means for Solving the Problem

To solve the abovementioned problem, the sealing device according to the present invention is characterized by being a sealing device for sealing between a valve body which is movably disposed in a valve box and which controls a flow of a fluid and a tube which is connected to the valve box or is a part of the valve box and through which the fluid flows, comprising a first seal portion that is a resin annular plate or film and is to be closely contacted with the outer surface of the valve body and a cylindrical second seal portion which is formed from a material more flexible than that of the first seal portion, contacts the inner surface or outer surface of the tube, and prevents the fluid from leaking from the tube, wherein the first seal portion and the second seal portion are integrally joined.

In the sealing device according to the present invention, the first seal portion, which is a plate or film to be closely contacted with the outer surface of the valve body, and the cylindrical second seal portion, which contacts the inner surface or outer surface of the tube, are integrally joined. As the second seal portion is formed from a material more flexible than that of the first seal portion, the first seal portion can be contacted to the outer surface of the valve body by pressing the annular first seal portion via the cylindrical second seal portion and contact of the first seal portion to the outer surface of the valve body is high. The first seal portion and the second seal portion are integrally joined, so the number of parts is reduced. Furthermore, in mounting on a valve device, the sealing device is disposed on the inside or outside of a tube, the first seal portion is closely contacted to the outer surface of a valve body by pressing the first seal portion via the second seal portion, and the sealing device may be fixed in this state. Accordingly, mounting on a valve device is easy.

In the sealing device in one aspect of the present invention, the entirety of the surface of the first seal portion on the opposite side of the surface to be closely contacted with the outer surface of the valve body is joined to the second seal portion. In this case, the entirety of the plate-shaped or film-shaped first seal portion is supported by the second seal portion, which is more flexible than the first seal portion. Accordingly, contact of the first seal portion to the outer surface of the valve body is high and even if the outer surface of the valve body is rough, the first seal portion can contact the outer surface of the valve body over a wide surface area. Further, when the valve body moves in the valve box, the first seal portion constantly closely contacts the outer surface of the valve body.

In the sealing device in one aspect of the present invention, a flange joined to the first seal portion is formed on an edge of the second seal portion and the flange protrudes inwards in the radial direction of the second seal portion. A fluid can flow inside the cylindrical second seal portion. At this time, the flange protruding inwards in the radial direction of the second seal portion receives high pressure from the fluid in the direction toward the valve body. Due to the flange on the second seal portion receiving such pressure, the first seal portion joined to the flange is also pressed toward the valve body. Accordingly, contact of the first seal portion to the outer surface of the valve body is further increased.

The sealing assembly according to the present invention comprises the abovementioned sealing device and a pressing mechanism which is fixed to the tube and presses the first seal portion and the second seal portion toward the valve body and closely contacts the first seal portion with the outer surface of the valve body. According to such a sealing assembly, in mounting a sealing device on a valve device, it is possible for the sealing device to be fixed by disposing the sealing device on the inside or outside of a tube, closely contacting the first seal portion to the outer surface of the valve body by the pressing mechanism pressing the first seal portion via the second seal portion, and fixing the pressing mechanism to the tube in this state. Accordingly, mounting of the sealing device is easy.

In the sealing assembly in one aspect of the present invention, the pressing mechanism comprises a ring that fits into a peripheral groove formed on the inner peripheral surface or the outer peripheral surface of the tube. In this case, it is possible to easily fix the sealing device by fitting the ring in the peripheral groove.

Effects of the Invention

In the present invention, contact of the first seal portion to the outer surface of the valve body is high. Moreover, the number of parts is reduced. Furthermore, mounting on a valve device is easy.

DESCRIPTION OF EMBODIMENTS

Below, various embodiments according to the present invention shall be explained with reference to the attached drawings.

First Embodiment

Figure 1:
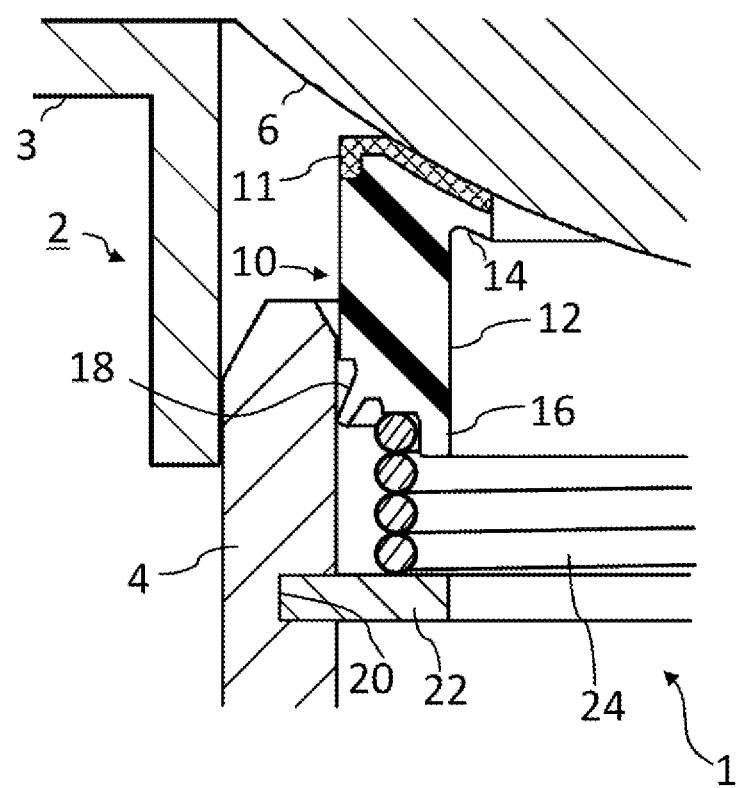
FIG. 1 A cross-sectional view of part of a sealing assembly according to the first embodiment of the present invention.
Figure 6:
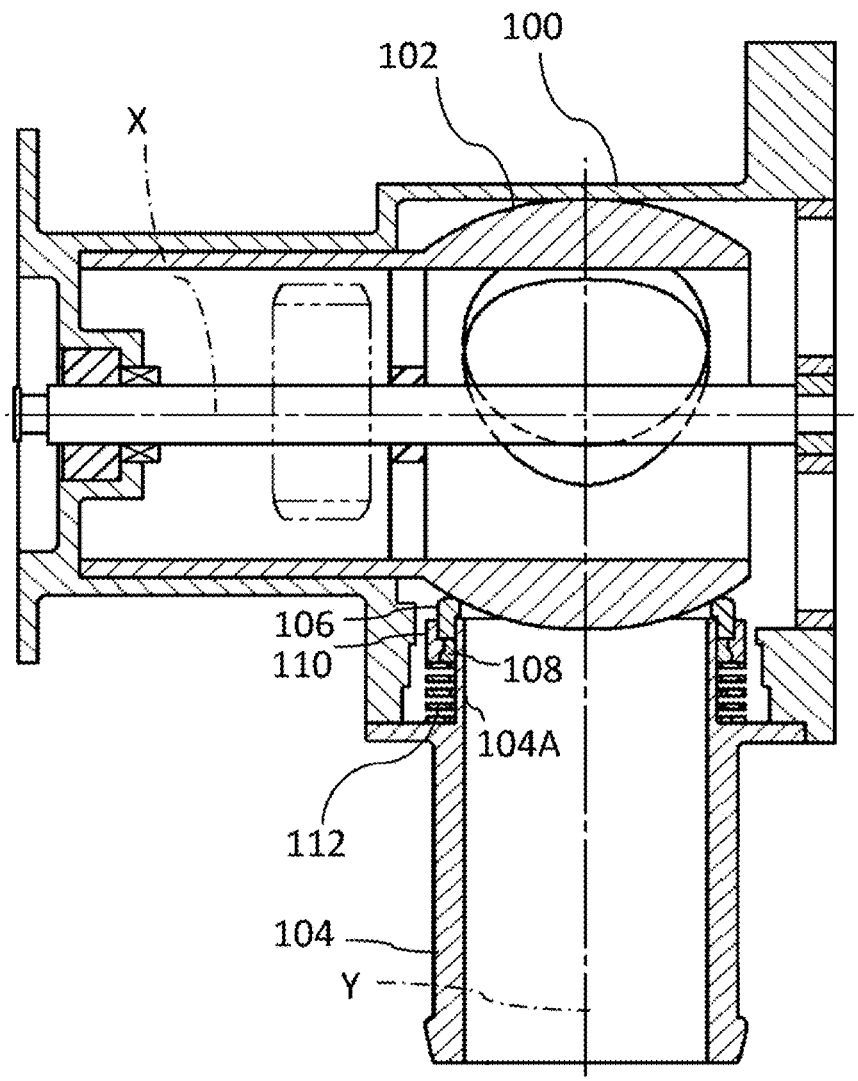
FIG. 6 A cross-sectional view of a conventional refrigerant control valve device.

FIG. 1 is a cross-sectional view of part of a sealing assembly 1 according to the first embodiment of the present invention. The sealing assembly 1 is applied to a valve device 2, which is similar to the refrigerant control valve device shown in FIG. 6. The valve device 2 comprises a valve box 3 (corresponding to valve housing 100 in FIG. 6), a tube 4 (corresponding to discharge cylinder 104 in FIG. 6) which is connected to the valve box 3 or is a part of the valve box 3 and through which a fluid flows, and a valve body 6 (corresponding to valve body 102 in FIG. 6) which is disposed in the valve box 3 and controls a flow of a fluid.

The valve device 2 to which the sealing assembly 1 is applied may be, for example, a valve device for supplying cooling water (refrigerant) for an internal combustion engine to a radiator, or may be another valve device. The fluid controlled by the valve device 2 may be a refrigerant such as cooling water or may be another fluid. Further, the illustrated tube 4 is provided downstream of the valve box 3 and the fluid moving through the valve box 3 transits the tube 4, but the tube 4 may be provided upstream of the valve box 3 and the fluid moving through the tube 4 transits the valve box 3.

The valve body 6 can move within the valve box 3, for example, can rotate, and along with this movement, adjusts the flow rate of the fluid transiting the valve device 2. In FIG. 1, the valve box 3 and the valve body 6 are only partially shown, but, similar to the valve body 102 in FIG. 6, the valve body 6 is disposed in the valve box 3 and can rotate about the same axis of rotation as axis of rotation X (not illustrated, but extending laterally above the section illustrated in FIG. 1).

The sealing assembly 1 has a sealing device 10 for preventing the fluid from leaking from the tube 4 and the valve body 6 by sealing therebetween and a pressing mechanism (a ring 22 and a coil spring 24 in this embodiment) for pressing the sealing device 10 toward the valve body 6.

The sealing device 10 is approximately circular and engages with the cylindrical tube 4, but only the left-hand portion thereof is shown in FIG. 1. Only the left-hand portions of the ring 22 and the coil spring 24 are shown as well. The sealing device 10 has a first seal portion 11 which is an annular resin plate or film and a cylindrical second seal portion 12 formed from a material more flexible than that of the first seal portion 11. The first seal portion 11 is formed from, for example, polytetrafluoroethylene (PTFE). The second seal portion 12 is formed from an elastic body, for example, an elastomer.

The first seal portion 11 is to be closely contacted with the outer surface of the valve body 6. The second seal portion 12 is disposed inside the tube 4, contacts the inner peripheral surface of the tube 4, and prevents fluid from leaking from the tube 4. Thus, the sealing device 10 seals such that the fluid transiting the valve body 6 and the tube 4 does not leak.

The first seal portion 11 and the second seal portion 12 are integrally joined. The technique for integration is arbitrary and may be, for example, adhering with an adhesive, or the first seal portion 11 and the second seal portion 12 may be bonded by making use of crosslinking of the material of the second seal portion 12.

A flange 14 is formed on the edge of the second seal portion 12 on the valve body 6 side and the flange 14 protrudes inwards in the radial direction of the second seal portion 12. The entirety of the surface of the first seal portion 11 on the opposite side of the surface to be closely contacted with the outer surface of the valve body 6 is joined to the flange 14 of the second seal portion 12.

A peripheral groove 20 is formed on the inner peripheral surface of the tube 4 and the ring 22, preferably a snap ring, fits into the peripheral groove 20. The ring 22 is fixed to the tube 4 and presses the second seal portion 12 and the first seal portion 11 toward the valve body 6, constituting a pressing mechanism for closely contacting the first seal portion 11 with the outer surface of the valve body 6. Preferably, the inner diameter of the ring 22 is set to a size with minimal disruption of the flow of the fluid in the tube 4.

In this embodiment, the pressing mechanism further has a coil spring 24. The coil spring 24 is disposed between the ring 22 and the second seal portion 12 and presses the sealing device 10 toward the valve body 6 via the restoring force thereof. A cutout into which the coil spring 24 fits is formed on an edge 16 of the second seal portion 12 on the opposite side of the first seal portion 11. The sealing device 10 and the pressing mechanism (in this embodiment, the ring 22 and the coil spring 24) can be considered to constitute one sealing assembly 1.

A lip, that is, a protrusion 18 for contacting the inner peripheral surface of the tube 4 across the entire periphery is formed on the peripheral external surface of the second seal portion 12 facing the tube 4. The protrusion 18 is an annular thin plate continuous in the circumferential direction, supported by the edge 16 of the second seal portion 12 on the inward radial side, and extending toward the free end on the outward radial side. The free end of the protrusion 18 is in contact with the inner peripheral surface of the tube 4 across the entire periphery. Upon receiving pressure from the fluid in the tube 4, the protrusion 18 is strongly pushed against the inner peripheral surface of the tube 4, such that the function of sealing the fluid increases. In this embodiment, the protrusion 18 is in contact with the inner peripheral surface of the tube 4 even when not receiving pressure from the fluid in the tube 4.

However, the protrusion 18 may be modified so that the protrusion 18 does not contact the tube 4 when not receiving pressure from the fluid in the tube 4 and the protrusion 18 contacts the inner peripheral surface of the tube 4 across the entire periphery due to elastic deformation upon receiving pressure from the fluid in the tube 4. In this case, in mounting the sealing device 10 on the valve device 2, it is possible to dispose the second seal portion 12 inside the tube 4 in a state in which the second seal portion 12 does not contact the tube 4 and there is little frictional resistance.

Figure 2:
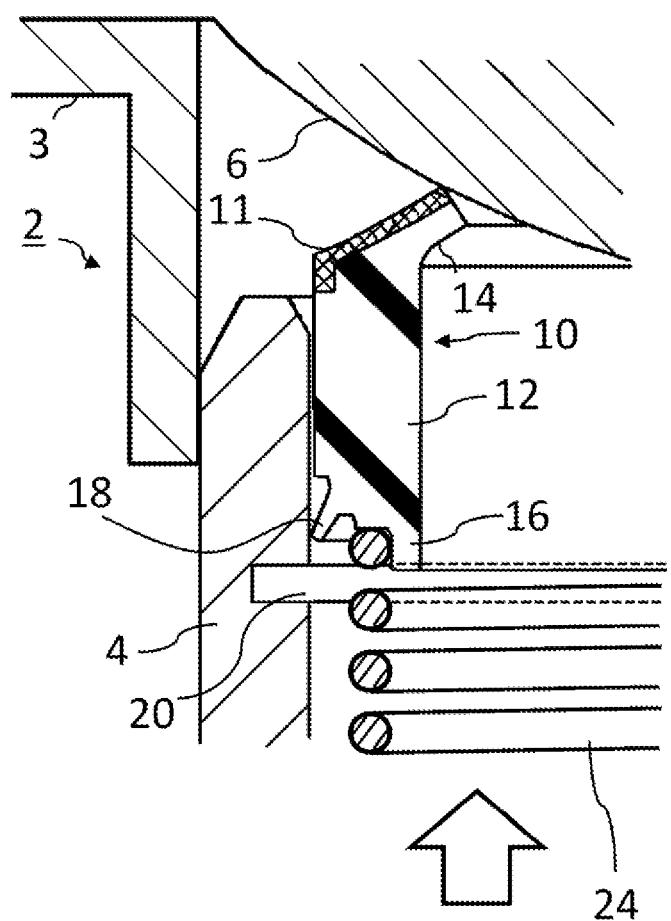
FIG. 2 A drawing showing a step for mounting the sealing assembly according to the first embodiment.

In mounting the sealing device 10 on the valve device 2, as shown in FIG. 2, the sealing device 10 is disposed inside the tube 4 and the first seal portion 11 is made to contact the outer surface of the valve body 6. In this state, a large portion of the flange 14 of the second seal portion 12 extends diagonally upwards from the edge of the outer side of the flange 14 in the illustration.

Next, in a state in which the coil spring 24 is fit into the cutout in the edge 16 of the second seal portion 12, the entirety of the outer surface of the first seal portion 11 is closely contacted to the outer surface of the valve body 6 by pressing the first seal portion 11 via the coil spring 24 and the second seal portion 12. Furthermore, as shown in FIG. 1, in this state, the ring 22 can be fit in the peripheral groove 20 of the tube 4 and the sealing device 10 fixed. As shown in FIG. 1, in a state equipped with the sealing device 10, a large portion of the flange 14 of the second seal portion 12 is pressed against the outer surface of the valve body 6 and extends diagonally downwards from the edge of the outer side of the flange 14 in the illustration.

In the sealing device 10 according to this embodiment, the first seal portion 11 to be closely contacted with the outer surface of the valve body 6 and the second seal portion 12 that contacts the inner surface of the tube 4 are integrally joined. The second seal portion 12 is formed from a material more flexible than that of the first seal portion 11, so the first seal portion 11 can be contacted to the outer surface of the valve body 6 by pressing the annular first seal portion 11 via the cylindrical second seal portion 11 and contact of the first seal portion 11 to the outer surface of the valve body 6 is high. Further, the entirety of the plate-shaped or film-shaped first seal portion 11 is supported by the second seal portion 12, which is more flexible than the first seal portion 11. Accordingly, contact of the first seal portion 11 to the outer surface of the valve body 6 is high and, even if the outer surface of the valve body 6 is rough, it is possible for the first seal portion 11 to contact the outer surface of the valve body 6 over a wide surface area. Further, when the valve body 6 moves in the valve box 3, the first seal portion 11 constantly closely contacts the outer surface of the valve body 6.

The fluid can flow inside the cylindrical second seal portion 12. At this time, the flange 14 protruding in the radial inner direction of the second seal portion 12 receives high pressure from the fluid in the direction toward the valve body 6. Due to the flange 14 of the second seal portion 12 receiving such pressure, the first seal portion 11 joined to the flange 14 is also pressed toward the valve body 6. Accordingly, contact of the first seal portion 11 to the outer surface of the valve body 6 is further increased.

The first seal portion 11 and the second seal portion 12 are integrally joined, so the number of parts is reduced. Accordingly, in mounting on the valve device 2, labor such as searching for parts and confirming the disposal direction can be reduced.

Furthermore, in mounting the sealing device 10 on the valve device 2, it is possible to fix the sealing device 10 by disposing the sealing device 10 inside the tube 4, closely contacting the first seal portion 11 to the outer surface of the valve body 6 by the pressing mechanism pressing the first seal portion 11 via the second seal portion 12, and fixing the pressing mechanism to the tube 4 in this state. Accordingly, mounting the sealing device 10 is easy.

The pressing mechanism comprises the ring 22 which fits into the peripheral groove 20 formed on the inner peripheral surface of the tube 4, so it is possible to easily fix the sealing device 10 by fitting the ring 22 in the peripheral groove 20 of the tube 4. When the ring 22 is a snap ring, the ring 22 is not continuous over the entire periphery, so the amount of deformation of the ring 22 is large and it is possible to easily fit the ring 22 in the peripheral groove 20 of the tube 4.

The protrusion 18 formed on the second seal portion 12 contacts the tube 4 across the entire periphery and is strongly pressed against the inner surface of the tube 4 upon receiving pressure from the fluid, so contact of the second seal portion 12 to the tube 4 is increased. In particular, even if the second seal portion 12 is eccentric with respect to the tube 4, close contact of the second seal portion 12 to the tube 4 by the protrusion 18 is reliable.

Meanwhile, excluding the protrusion 18, the outer diameter of the second seal portion 12 is set smaller than the inner diameter of the tube 4. Therefore, in mounting the sealing device 10 on the valve device 2, it is possible to dispose the second seal portion 12 inside the tube 4 in a state with little frictional resistance by avoiding contacting the second seal portion 12, excluding the protrusion 18, with the tube 4.

Second Embodiment

Figure 3:
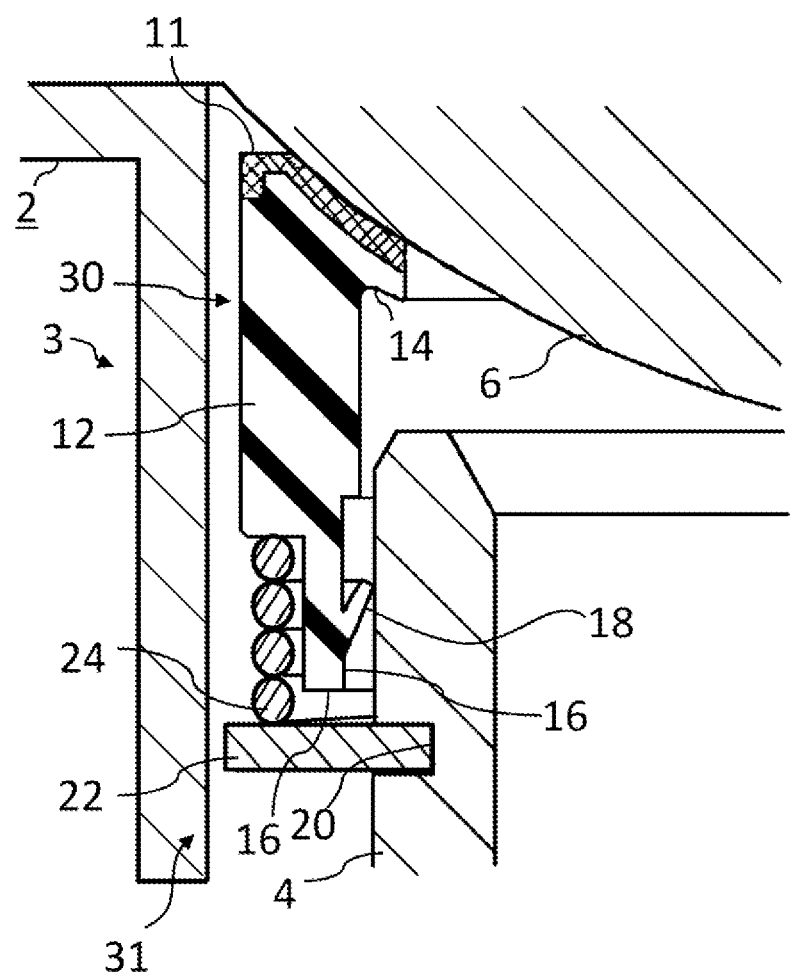
FIG. 3 A cross-sectional view of part of a sealing assembly according to the second embodiment of the present invention.

FIG. 3 shows a sealing assembly 31 according to the second embodiment of the present invention. In drawings from FIG. 3 onward, the same reference numbers are used to indicate components shared with the first embodiment and these components will not be explained in detail.

The sealing assembly 31 has a sealing device 30 for preventing fluid from leaking from the tube 4 and the valve body 6 by sealing therebetween and a pressing mechanism (the ring 22 and the coil spring 24 in this embodiment) for pressing the sealing device 30 toward the valve body 6.

The sealing device 10 and the coil spring 24 are disposed inside the tube 4 in the first embodiment, whereas the sealing device 30 and the coil spring 24 are disposed outside the tube 24 in the second embodiment. Accordingly, in this embodiment, the peripheral groove 20 is formed on the outer peripheral surface of the tube 4 and the ring 22, preferably a snap ring, fits into the peripheral groove 20.

A lip, that is, the protrusion 18 for contacting the outer peripheral surface of the tube 4 across the entire periphery is formed on the inner peripheral surface of the second seal portion 12 facing the tube 4. The protrusion 18 is an annular thin plate continuous in the circumferential direction, supported by the edge 16 of the second seal portion 12 on the outward radial side, and extending toward the free end on the radial outward side. The free end of the protrusion 18 contacts the outer peripheral surface of the tube 4 over the entire periphery. Upon receiving pressure from the fluid in the tube 4, the protrusion 18 is strongly pressed against the outer peripheral surface of the tube 4 such that the function of sealing the fluid increases. In this embodiment, the protrusion 18 contacts the outer peripheral surface of the tube 4 even when not receiving pressure from the fluid in the tube 4.

However, the protrusion 18 may be modified so that the protrusion 18 does not contact the tube 4 when not receiving pressure from the fluid in the tube 4 and the protrusion 18 contacts the outer peripheral surface of the tube 4 across the entire periphery due to elastic deformation upon receiving pressure from the fluid in the tube 4. In this case, in mounting the sealing device 10 on the valve device 2, it is possible to dispose the second seal portion 12 outside the tube 4 in a state in which the second seal portion 12 does not contact the tube 4 and there is little frictional resistance.

In the mounting of the sealing device 30 on the valve device 2, the sealing device 30 is disposed on the outside of the tube 4 and the first seal portion 11 is made to contact the outer surface of the valve body 6. Next, in a state in which the coil spring 24 is fit into the cutout in the edge 16 of the second seal portion 12, the entirety of the outer surface of the first seal portion 11 is closely contacted to the outer surface of the valve body 6 by pressing the first seal portion 11 via the coil spring 24 and the second seal portion 12. Furthermore, in this state, the ring 22 can be fit into the peripheral groove 20 of the tube 4 and the sealing device 30 fixed.

According to this embodiment, even if there is a difference in the positions of the sealing device and the coil spring 24, it is possible to achieve effects similar to those of the first embodiment. Excluding the protrusion 18 and the flange 14, the inner diameter of the second seal portion 12 (locations excluding the flange 14 among the locations of the second seal portion 12 which have the possibility of approaching the outer peripheral surface of the tube 4) is set larger than the outer diameter of the tube 4. Therefore, in mounting the sealing device 10 on the valve device 2, it is possible to dispose the second seal portion 12 outside the tube 4 in a state with little frictional resistance by avoiding contacting the second seal portion 12, excluding the protrusion 18, with the tube 4.

Third Embodiment

Figure 4:
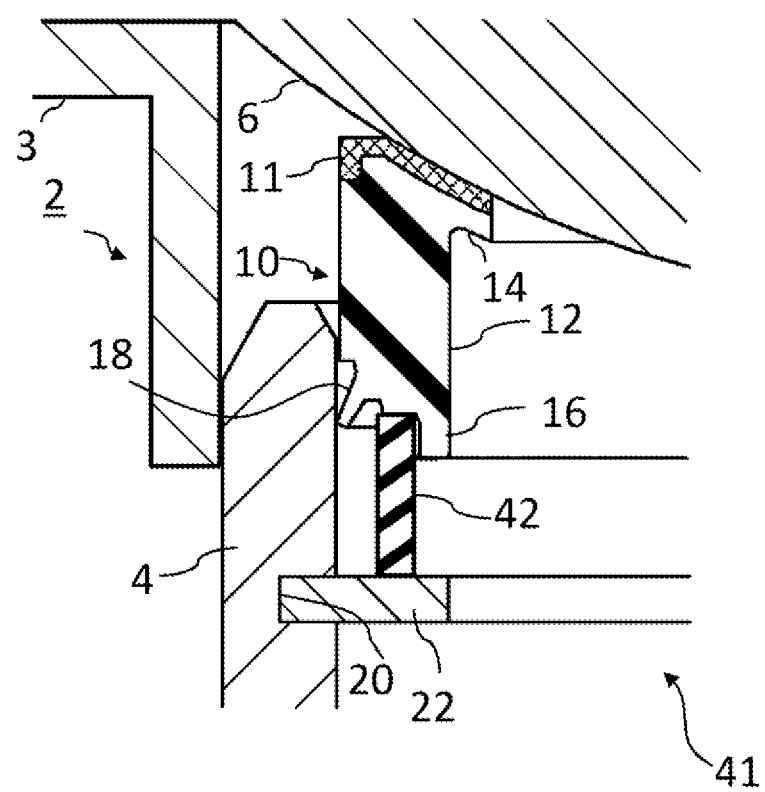
FIG. 4 A cross-sectional view of part of a sealing assembly according to the third embodiment of the present invention.

FIG. 4 shows a sealing assembly 41 according to the third embodiment of the present invention. The sealing assembly 41 has a sealing device 10 which is the same as that in the first embodiment and a pressing mechanism (in this embodiment, the ring 22 and a cylindrical elastic body 42) for pressing the sealing device 10 toward the valve body 6.

In this embodiment, the cylindrical elastic body 42 is provided in place of the coil spring 24. The cylindrical elastic body 42 is formed from, for example, an elastomer. The cylindrical elastic body 42 is disposed between the ring 22 and the second seal portion 12 and presses the sealing device 10 toward the valve body 6 via the restoring force thereof. A cutout into which the cylindrical elastic body 42 fits is formed on the edge 16 of the second seal portion 12 on the opposite side of the first seal portion 11.

The cylindrical elastic body 42 may be provided in place of the coil spring 42 in the second embodiment (FIG. 3).

Fourth Embodiment

Figure 5:
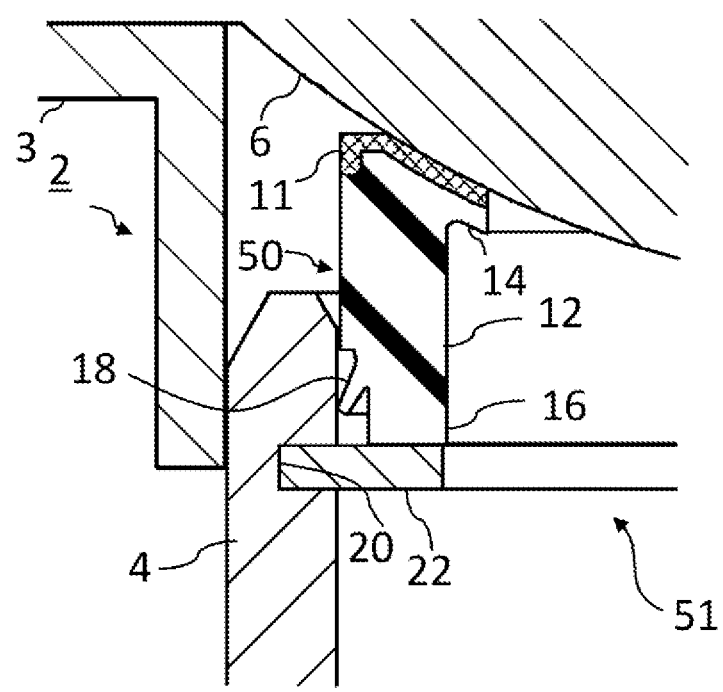
FIG. 5 A cross-sectional view of part of a sealing assembly according to the fourth embodiment of the present invention.

FIG. 5 shows a sealing assembly 51 according to the fourth embodiment of the present invention. The sealing assembly 51 has a sealing device 50 similar to the sealing device 10 of the first embodiment and a pressing mechanism (in this embodiment, only the ring 22) for pressing the sealing device 50 toward the valve body 6.

In this embodiment, the sealing device 50 is pressed toward the valve body 6 only by the ring 22 fit into the peripheral groove 20 on the inner peripheral surface of the tube 4, without providing the coil spring 24 or the cylindrical elastic body 42. The second seal portion 12 of the sealing device 50 is an elastic body and is compressed between the ring 22 and the valve body 6. Due to the restoring force of the second seal portion 12, the first seal portion 11 of the sealing device 50 is pressed toward the valve body 6.

Effects similar to those of the first embodiment can be achieved according to this embodiment as well. The second embodiment may also be modified as in the fourth embodiment.

Other Variations

In the above embodiments, the valve body 6 has an outer surface similar to a part of a sphere. However, the valve body 6 may be cylindrical. In this case, the sealing device would be modified so as to have a shape and dimensions in accordance with the shape of the outer surface of the valve body 6 such that the first seal portion 11 closely contacts the outer surface of the valve body 6.

Applicant recognizes that a valve device comprising a valve box connected to a tube through which a fluid flows or having the tube, a valve body that is movably disposed in the valve box and controls flowing of the fluid, and a sealing device according to the present invention for sealing between the valve body and the tube is also an aspect of the present invention.

EXPLANATION OF THE REFERENCE NUMBERS 1, 31, 41, 51 Sealing assembly
10, 30, 50 Sealing device
2 Valve device
3 Valve box
4 Tube
6 Valve body
11 First seal portion
12 Second seal portion
14 Flange
16 Edge
18 Protrusion
20 Peripheral groove
22 Ring
24 Coil spring
42 Cylindrical elastic body

The invention claimed is:

1. A sealing device for sealing between a valve body that is movably disposed in a valve box and controls a flow of a fluid and a tube that is connected to the valve box or is a part of the valve box and through which the fluid flows, comprising:
  a first seal portion which is a resin annular plate or film and is to be closely contacted with an outer surface of the valve body; and
  a cylindrical second seal portion which is formed from a material more flexible than the material of the first seal portion, contacts an inner surface or an outer surface of the tube, and prevents the fluid from leaking from the tube, wherein the first seal portion and the second seal portion are integrally joined, a flange joined to the first seal portion is formed on an edge of the second seal portion and the flange protrudes inwards in the radial direction of the second seal portion, in mounting the sealing device on a valve device comprising the valve body, the valve box, and the tube, the flange extends in a direction toward the valve body from the edge of the outer side of the flange, and in a state equipped with the sealing device on the valve device, the flange extends along with the valve body from the edge of the outer side of the flange.

2. The sealing device according to claim 1, wherein the entirety of the surface of the first seal portion on the opposite side of the surface to be closely contacted with the outer surface of the valve body is joined to the second seal portion.

3. A sealing assembly comprising:

the sealing device according to claim 1; and a ring that is fixed to the tube and presses the second seal portion and the first seal portion toward the valve body and closely contacts the first seal portion with the outer surface of the valve body.

4. The sealing assembly according to claim 3, wherein the ring fits into a peripheral groove formed on an inner peripheral surface or an outer peripheral surface of the tube.

5. The sealing assembly according to claim 3, further comprising a spring disposed between the ring and the second seal portion, wherein the ring presses the second seal portion and the first seal portion toward the valve body via a restoring force of the spring.

6. The sealing assembly according to claim 3, further comprising a cylindrical elastic body disposed between the ring and the second seal portion, wherein the ring presses the second seal portion and the first seal portion toward the valve body via a restoring force of the cylindrical elastic body.

7. The sealing assembly according to claim 3, wherein the ring presses the second seal portion and the first seal portion toward the valve body via a restoring force of the second seal portion.

* * * * *